United States Patent [19]
Warneke

[11] Patent Number: 5,950,806
[45] Date of Patent: Sep. 14, 1999

[54] BELT GUIDING STATION

[75] Inventor: Karl Warneke, Sibbesse, Germany

[73] Assignee: Transnorm System GmbH, Harsum, Germany

[21] Appl. No.: 09/127,836

[22] Filed: Aug. 4, 1998

[30] Foreign Application Priority Data

Aug. 12, 1997 [DE] Germany .................. 297 14 416 U

[51] Int. Cl.[6] .................................................. B65G 39/16
[52] U.S. Cl. ............................................................. 198/806
[58] Field of Search ............................... 198/806, 810.03

[56] References Cited

U.S. PATENT DOCUMENTS

| | | | |
|---|---|---|---|
| 2,160,057 | 5/1939 | Carus et al. | 198/806 |
| 2,909,273 | 10/1959 | Smith | 198/806 |
| 3,593,841 | 7/1971 | Leow | 198/806 |
| 4,506,782 | 3/1985 | Jeanneret | 198/806 |

FOREIGN PATENT DOCUMENTS 1439105  3/1965  France ................................ 198/806

*Primary Examiner*—James R. Bidwell
*Attorney, Agent, or Firm*—Collard & Roe, P.C.

[57] ABSTRACT

A guiding station for preventing the conveyor belt of a belt conveyor from running off sideways from a preset direction and running up against the supporting structure of the conveyor. The guiding station comprises a console secured to a cylindrical element and forming an axis of rotation of the console so that the console is swingable in a plane perpendicular to the plane of the conveyor belt. A pair of guide rollers are supported by the console and are rotatable around their longitudinal axes. The lower strand of the conveyor belt is guided between the guide rollers. A plurality of sensor rollers are rotatably mounted on the guiding station upstream in the running direction of the conveyor belt from the guide rollers and on both sides of the lower strand of the conveyor belt.

11 Claims, 7 Drawing Sheets

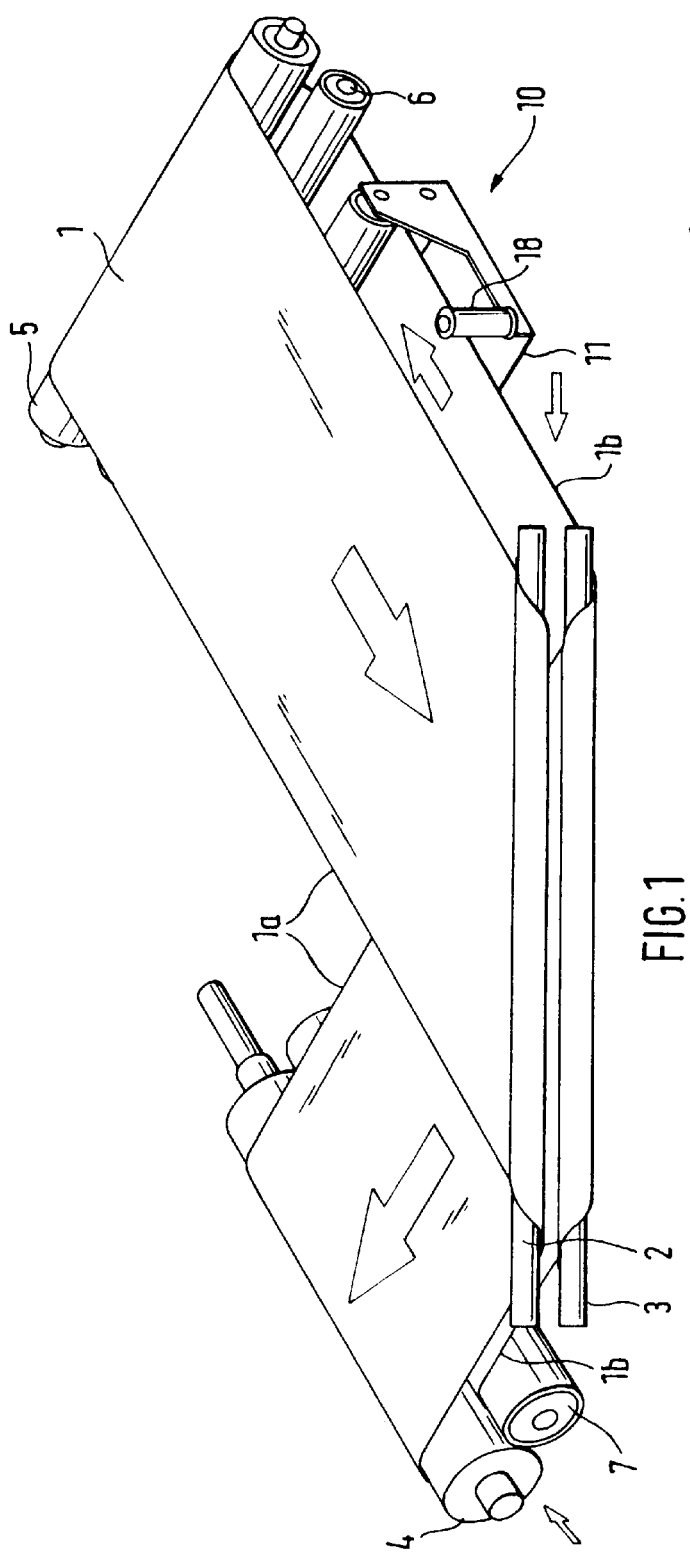
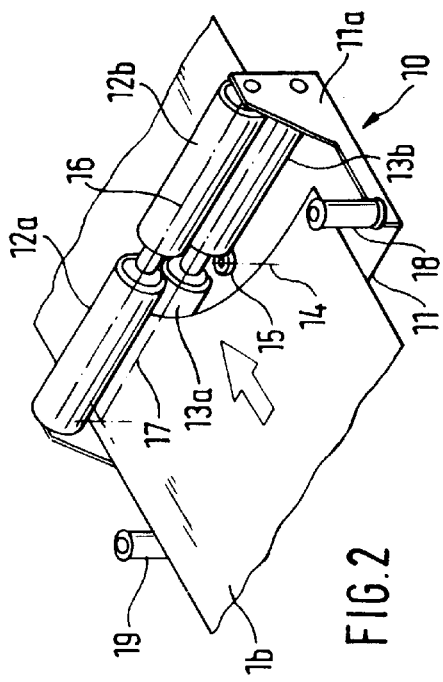

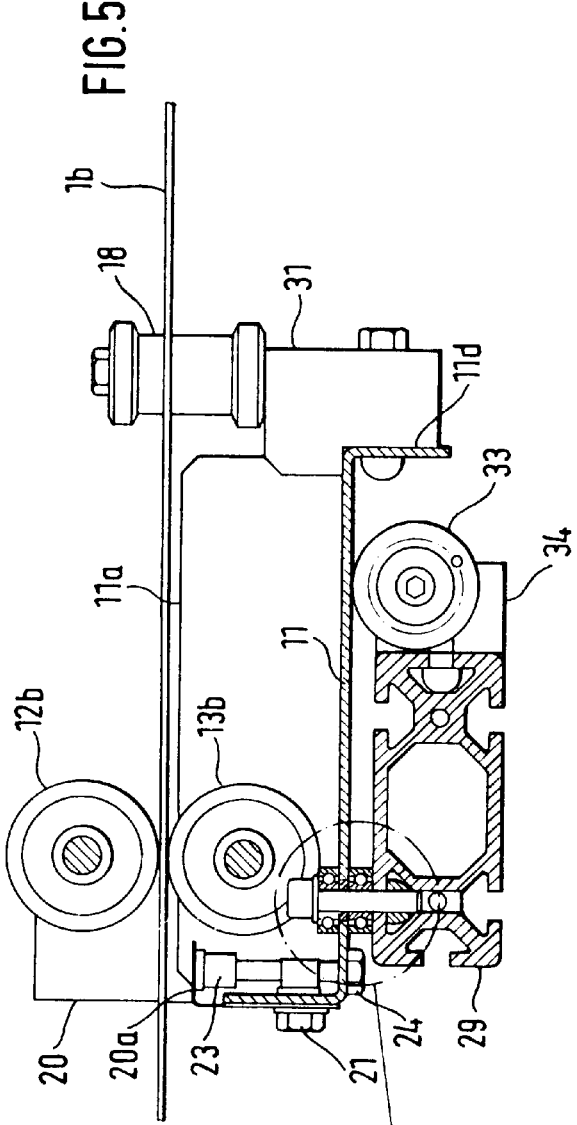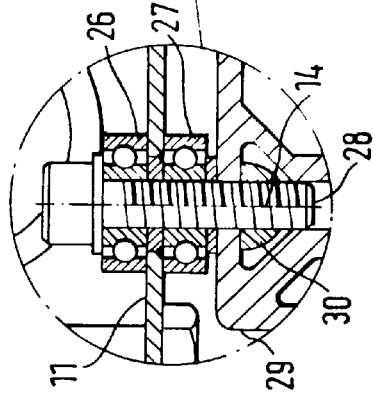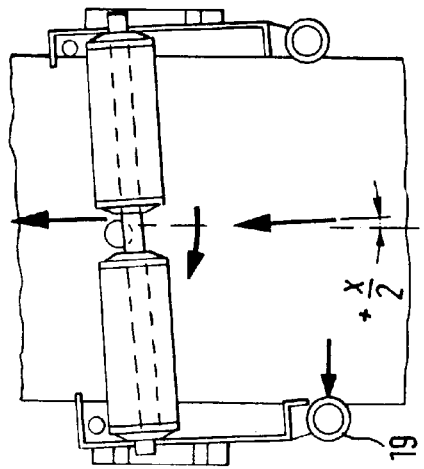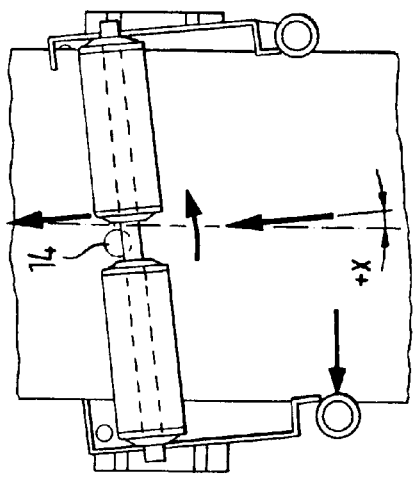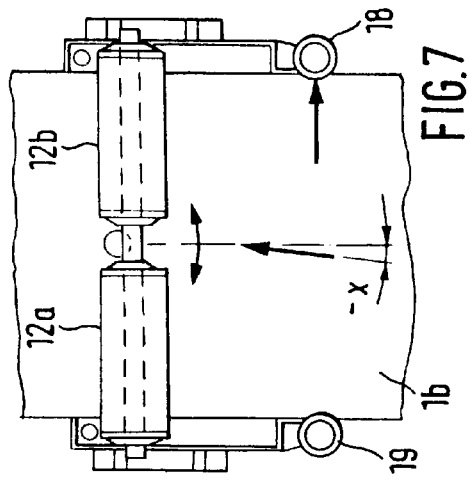

BELT GUIDING STATION

BACKGROUND OF THE INVENTION

1. Field of the Invention

This invention relates to a guide roller device for the conveyor belt of a belt conveyor that prevents the belt from running off sideways or up against the supporting structure of the conveyor.

2. The Prior Art

Rigid reversing rods have been commonly used in connection with devices for channeling conveyed materials at an acute angle into or out of the conveying track of a belt conveyor. The friction of the conveyor belt on the reversing rods generates heat, which is transferred unevenly onto the strands of the belt. This may result in nonuniform tension of the belt, which causes it to run off sideways until it comes into contact with the supporting framework of the device.

In order to keep the heating of the reversing rods low, the belt is not tightened when it is mounted, or it is tightened only slightly. Running sideways against the supporting frame causes the belt to bulge. Furthermore, the belt material, and in particular the polyester fabric contained therein, shrinks with rising temperatures. This may result in a disproportionate and uneven rise in the belt tension, and may even lead to a total breakdown of the conveyor.

For conveyor belts that have a tendency to run off course sideways, it is known to employ a guide roller to counteract lateral run-off. The guide roller acts only on a surface of the lower strand of the belt. This is the surface, which after the belt has been reversed into the upper strand, carries the stock being conveyed. This guide roller is swingable in the plane of the belt by a few degrees. With a guide roller of the known type, sensor bars are rigidly connected with it and are arranged upstream of and apart from the guide roller. The guide rollers are arranged on both sides of the belt. If an edge of the belt runs against the sensor bar associated with it, the guide roller is swivelled by the contact pressure of the belt. The guide roller rolls with a motion inclined relative to the running direction of the belt, which leads to forces of reaction. These forces have a component acting transverse to the direction of the belt, and lead to a resetting of the belt.

In addition, guide rollers driven by external force are known. These rollers can be adjusted, i.e., swivelled, via contactless scanning devices such as light barriers or capacitive sensors with the help of pneumatically operating devices or electric motors.

The known systems, however, are not suitable for conveyor belts having almost no tension, such as with a device for channeling conveyed goods into and out of a conveyor line as shown in European Patent No. EP 0 678 464 A1. Loose belts with such low tension are capable of transmitting only very low guide roller forces, which are insufficient for resetting a belt running off course. Furthermore, adequate transverse stiffness is missing, so that transmission of the laterally directed resetting forces is made more difficult. Therefore, the known guide roller devices cannot be used with a very flexible belt and are limited to stiff and tightened belts for systems that transport bulk materials.

SUMMARY OF THE INVENTION

It is therefore an object of the present invention to create a guiding device for conveyor belts that is capable of admitting resetting forces into stiff and tightened belts that have a tendency to run off course sideways, but is also capable of transmitting controlling forces against lateral run-off to loose or only slightly tightened and very flexible belts with transverse instability.

This and other objects are accomplished by a guiding station for the conveyor belt of a belt conveyor comprising a console having a pair of guide rollers that are rotatably arranged in the guiding station and turn around their longitudinal axes. The lower strand of the belt is guided between the guide rollers. The guiding station is designed to swing around an axis of rotation extending perpendicular to the plane of the belt that is formed by a cylindrical element on which the console is secured. The guiding station further comprises sensor rollers rotatably mounted on the guiding station and disposed upstream of the guide rollers in the running direction of the lower strand and on both sides of the lower strand of the belt.

With very wide belts or with higher forces of contact pressure, it is possible to design the guide rollers in the form of multi-part elements for facilitating the swiveling capability. This substantially reduces the rubbing effect.

The contact of the belt edges with the sensor rollers generates low rolling friction and saves the edges of the belt. This is particularly advantageous with thin, flexible belts, or with belts having transverse instability. Particularly advantageous is the application of an elastic contact pressure acting on the guide rollers.

The guiding station according to the invention is suitable for efficiently controlling not only belts tensioned in the usual way, but also thin, flexible belts in an untensioned state without the application of external force for controlling the belts automatically. In this way, the belts are prevented from running off of their driving, supporting and reversing rollers in a sideways direction. The transverse stiffness of the belt is automatically improved with an elastic contact pressure. The belt constantly receives the required contact pressure with the correct quantity. It is no longer necessary with the present device to take buckles of the belt into account. The application of elastic contact forces is advantageous especially with low belt thicknesses, as the buckles of the belt cause a considerable difference in the thickness of the belt.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 shows a diagrammatic representation of a device for channeling conveyed stock in and out of a conveyor line, with a guiding station mounted thereto;

FIG. 2 shows a diagrammatic representation of the guiding station according to the invention with divided guide rollers;

FIG. 5 shows a longitudinal section along the belt center line through the guiding station according to FIG. 3;

FIG. 6 shows a detail of FIG. 5;

FIGS. 7–9 show different positions of the guide rollers during use;

DETAILED DESCRIPTION OF THE PREFERRED EMBODIMENT

Figure 4:
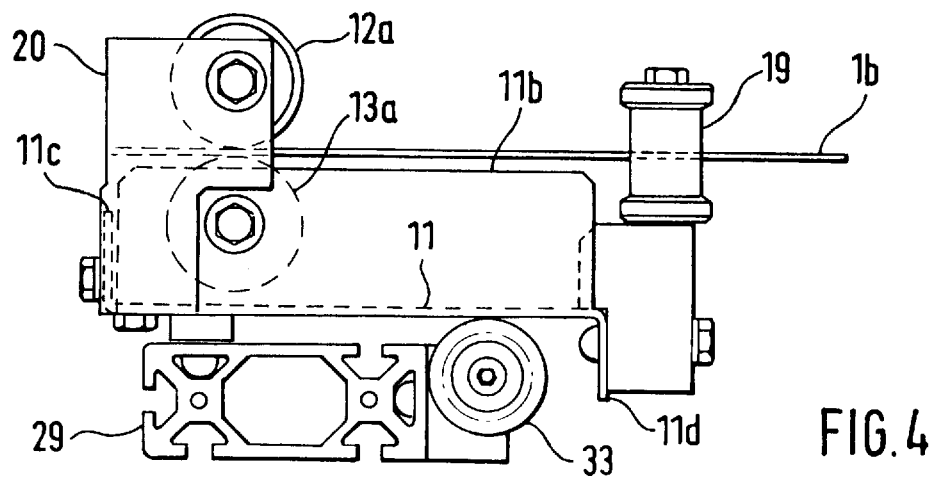
FIG. 4 shows a side view of the guiding station shown in FIG. 3.
Figure 3:
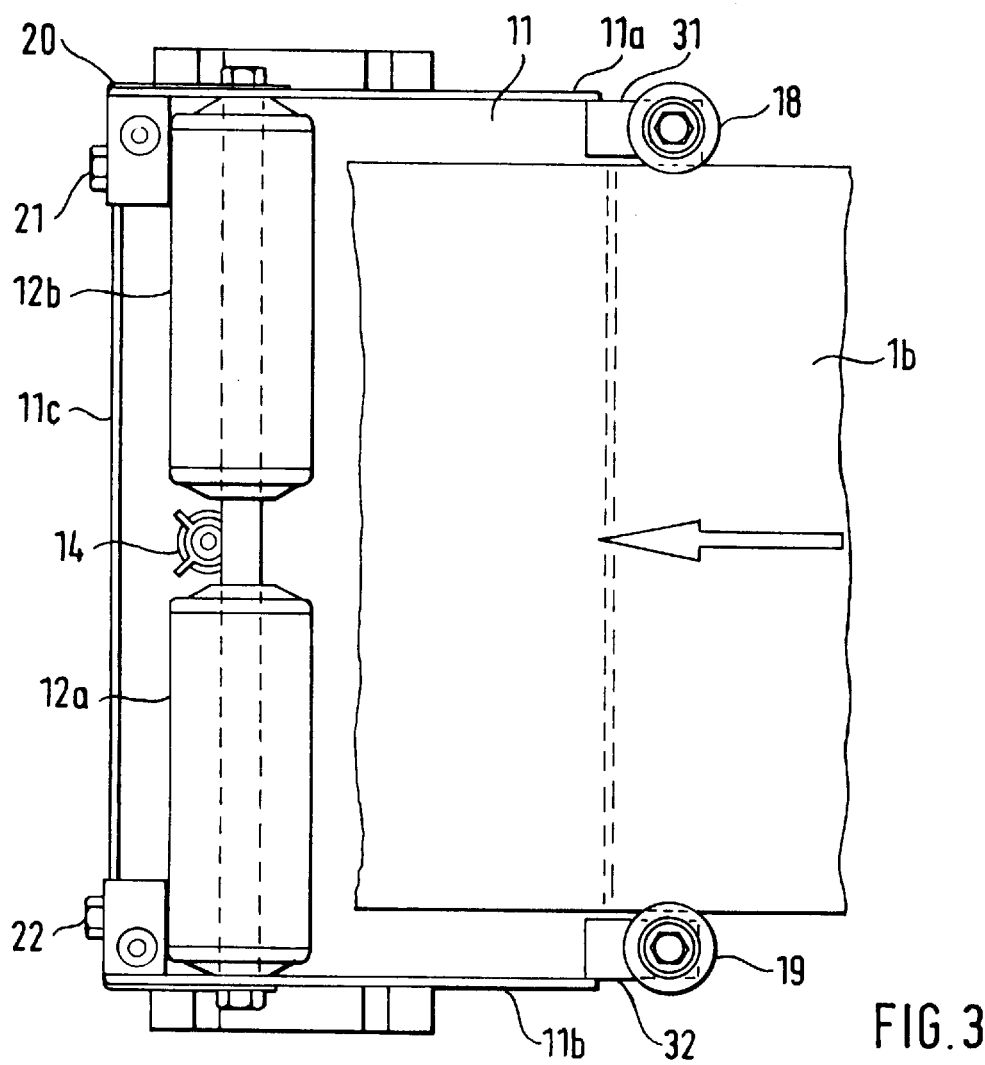
FIG. 3 shows a top view of a guiding station according to the invention with guide rollers.

Referring now in detail to the drawings and, in particular, FIGS. 1 and 2 show a schematic representation of the invention and FIGS. 3–5 show an actual embodiment of the invention, which comprises a guiding station 10 having a console 11 with roller pairs 12a, 12b, 13a and 13b mounted in console 11. Lower strand 1b of belt 1 passes through between the pairs of rollers.

Console 11 is pivotable around pivot axis 14 of pivot journal 15. Sensor rollers 18 and 19 are mounted on either side of the belt strand on the front part of console 11, upstream of the axis of rotation of the guide rollers. The edges of the belt strand are capable of running up against the sensor rollers 18 and 19, which are rotatable and thereby reduce wear caused by low rolling friction.

Console 11 has two lateral, upwardly chamfered edges 11a, 11b and a face side upwardly chamfered edge 11c. On the part of the console disposed upstream of the guide rollers in the running direction of belt strand 1b, the console has a downwardly chamfered edge 11d. The lateral edges 11a, 11b secure the lower guide rollers 13a, 13b. The top roller pair 12a, 12b is supported by a roller holder 20, which is mounted on upwardly chamfered edge 11c by screws 21 and 22. Roller holder 20 supports a rivet nut 23 on an inwardly bent fishplate 20a. Rivet nut 23 is engaged by a set screw 24 for vertical adjustments. Roller holder 20 can thus be vertically adjusted by set screw 24.

As shown in FIG. 6, console 11 is chucked between spherical rings 26 and 27 and is connected with a supporting section 29 via a gudgeon in the form of a cylinder screw 28. Cylinder screw 28 engages a slot key 30 having a female thread, which is inserted into a slot in the supporting profile. The console and thus the entire guiding station is rotatable around axle 14 via spherical rings 26 and 27. The front, downwardly chamfered edge lid secures sensor rollers 18 and 19 via axle holders 31 and 32.

To reduce the stress on cylinder screw 28, console 11 may be supported by a supporting roller 33, which is secured on supporting section 29 via an axle holder 34.

FIG. 7 shows that the belt has a tendency to run off to the right in the plane of the drawing. The right edge of the belt applies pressure to the right sensor roller 18. This causes the sensor roller 18 to yield to the right, so that a swivel motion results counterclockwise as shown in FIG. 9. This swivel motion causes the guide rollers driven by the belt to generate forces of reaction with a component directed to the left. This adjusts the belt again to the left until the left sensor roller 19 comes into contact with the left edge of the belt and slightly yields to the left due to the resetting force, so that the entire guiding station swings back in the clockwise direction. This reduces the resetting effect of the guide roller. However, the run of the belt is aligned further to the left. This self-adjustment process is completed as soon as all of the forces are in equilibrium.

Figure 10:
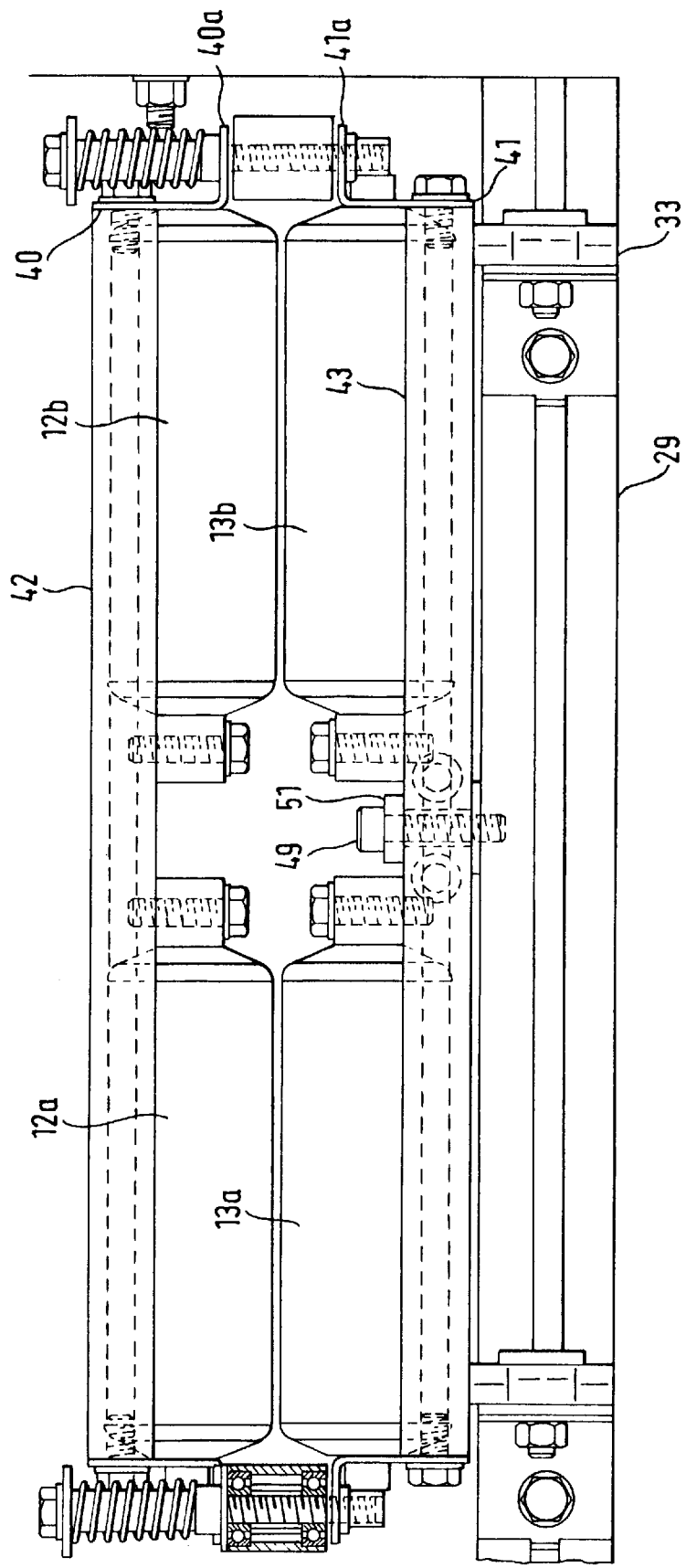
FIG. 10 shows a guiding device having elastic elements for applying contact pressure.
Figure 11:
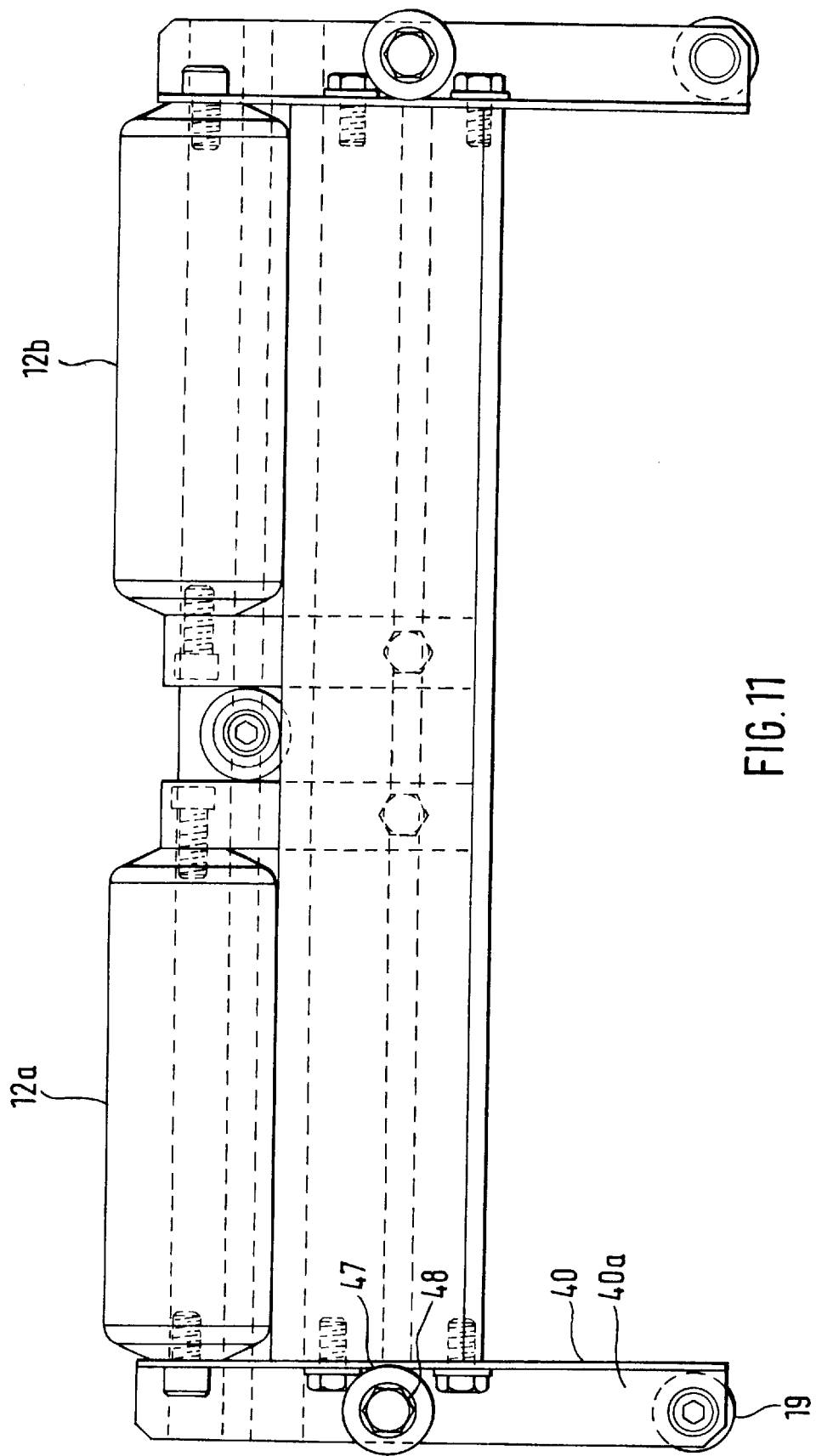
FIG. 11 shows a top view of the guiding device according to FIG. 10.
Figure 12:
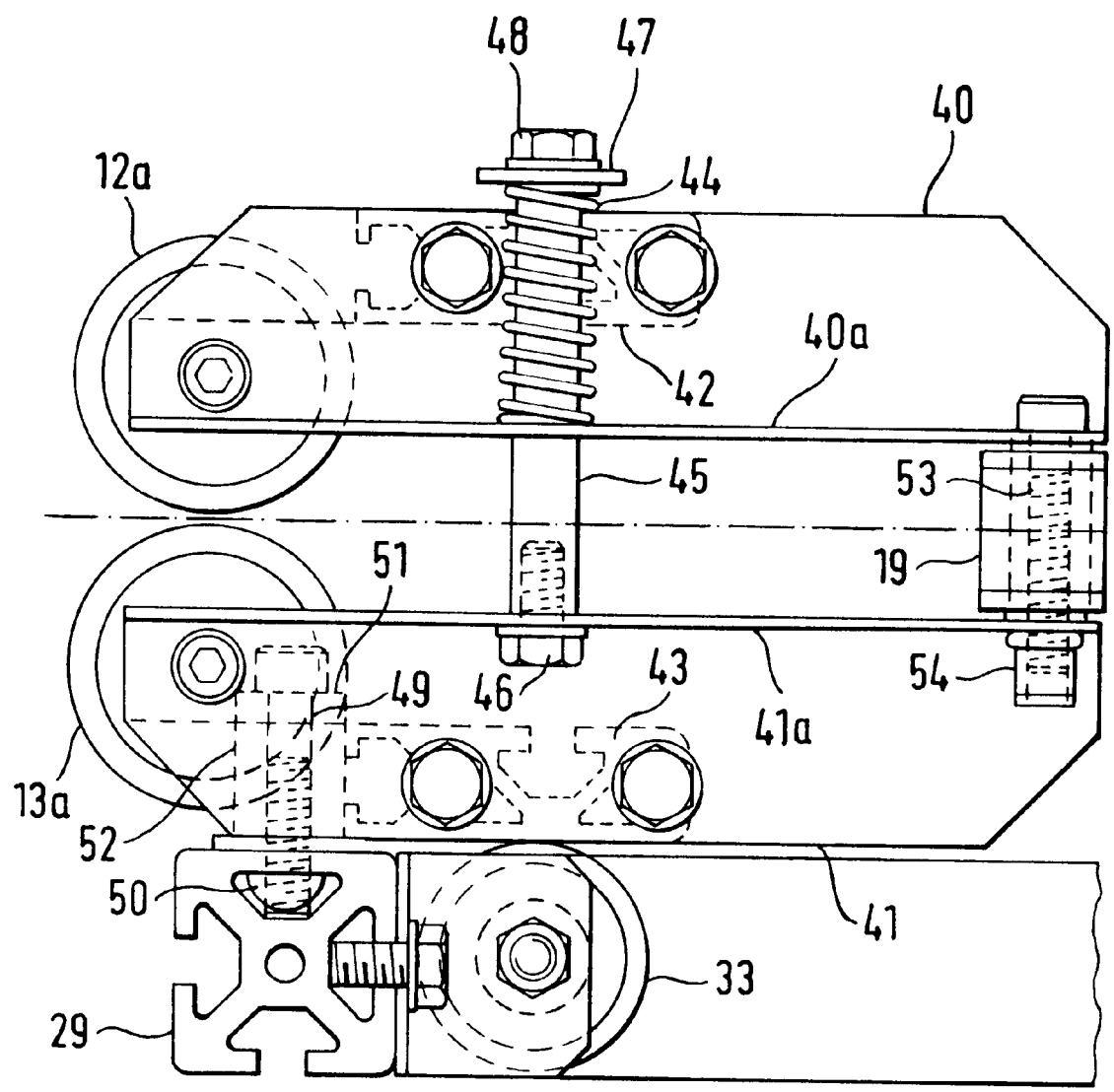
FIG. 12 is a side view of the guiding device according to FIGS. 10 and 11.
Figure 13:
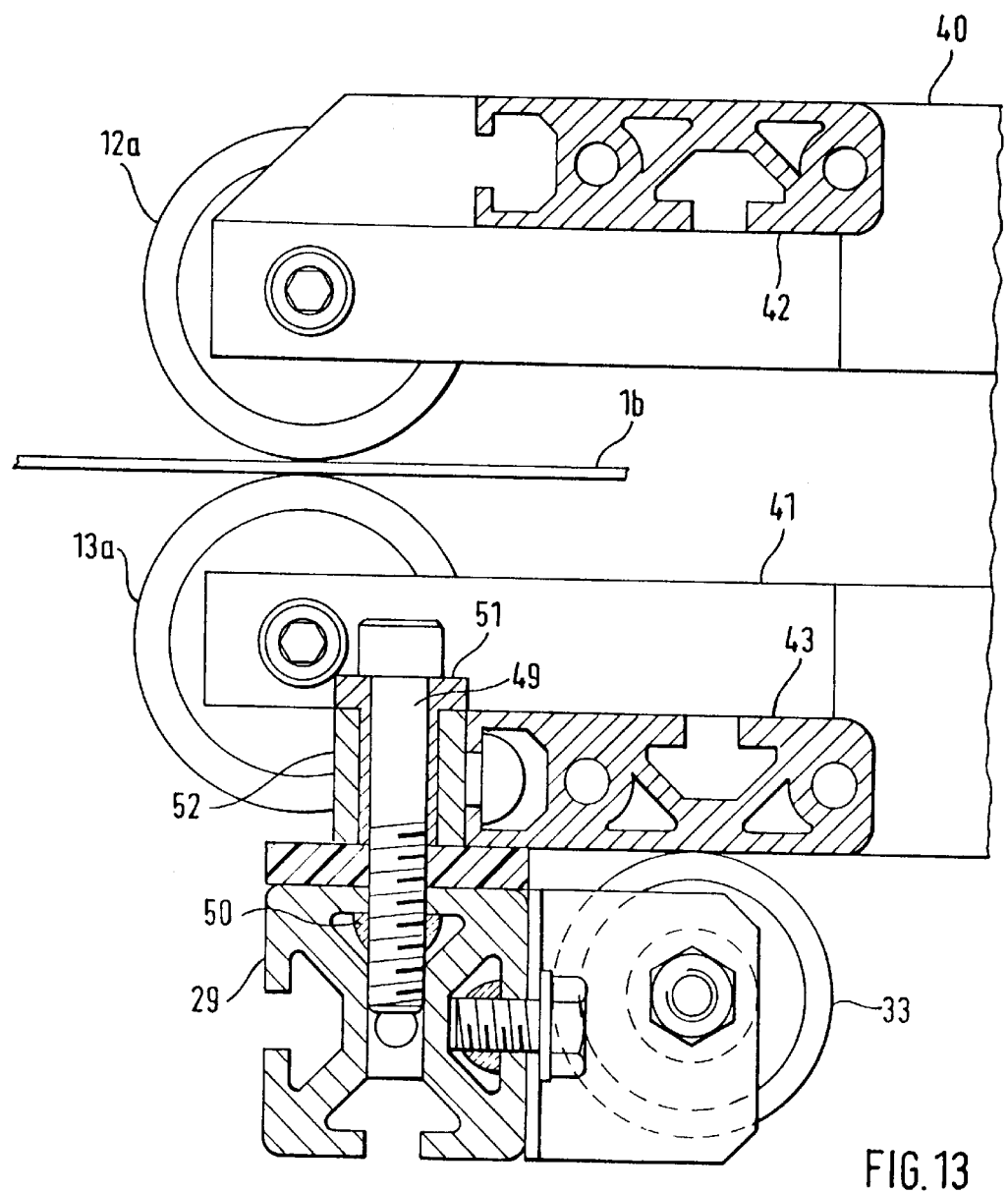
FIG. 13 is a side view of a part of the guiding device according FIGS. 10–12 with a longitudinal section along the axis of rotation in the form of a cylinder screw.

With the design according to FIGS. 10–12, guide rollers 12a, 13a, and 12b, 13b are secured on separate side parts 40 and 41. Cross connection sections 42 and 43 are provided for connecting the side parts with each other. These parts jointly form the consoles supporting the guide rollers.

Side parts 40 and 41 of the console are chamfered outwardly at right angles at the ends facing each other in order to form securing strips 40a and 41a. These strips hold helical pressure springs 44 that generate an elastic load on guide rollers 12a, 12b, so that an elastic pressure is applied to the lower strand of the conveyor belt from both sides. The helical pressure springs comprise spring guides 45, which are cylindrical rods extending through side strips 40a and 41a. The lower ends are provided with screws for forming a spring guide stop 46. The upper ends are terminated by pressure disks 47 and are secured with a screw 48. Helical pressure springs 44 are clamped between pressure disks 47 and skid strips 40a of side parts 40.

The entire console with guide rollers 12a, 12b, 13a, 13b is rotatable around an axis of rotation 49 in the form of a cylindrical screw. The lower end of axle 49 engages through slot key 50, which is secured on supporting section 29. In this arrangement, it extends through a rotary sleeve 51, which is rotatably supported in a spacer part, in which it is slidingly supported by a collar.

Rollers 18 and 19 on the ends of side parts 40 and 41 disposed opposite the guide rollers are rotatable around axes of rotation 53, which are in the form of cylinder screws. With their lower ends they engage in screw attachments 54, which are rigidly connected with side strips 40a and 41a.

Accordingly, while only a few embodiments of the present invention have been shown and described, it is obvious that many changes and modifications may be made thereunto without departing from the spirit and scope of the invention.

What is claimed is:

1. A guiding station for preventing the conveyor belt of a belt conveyor from running off sideways from a preset direction and running up against the supporting structure of the conveyor, wherein the conveyor belt has a predetermined running direction and a lower strand, said guiding station comprising:

a console;

a cylindrical element securing said console and forming an axis of rotation of the console, said console being swingable in a plane parallel to the plane of the conveyor belt;

a pair of guide rollers supported by said console, said rollers being rotatable around their longitudinal axes, wherein the lower strand of the conveyor belt is guided between said rollers; and a plurality of sensor rollers rotatably mounted on the guiding station upstream in the running direction of the conveyor belt from the guide rollers and on both sides of the lower strand of the conveyor belt.

2. The guiding station according to claim 1, wherein the guide rollers are divided into a plurality of sections.

3. The guiding station according to claim 1, wherein the console is rotatably supported between ball bearing races.

4. The guiding station according to claim 1, wherein the console comprises a one-piece metal sheet with upwardly and downwardly chamfered face and side parts on which the guide rollers and sensor rollers are secured.

5. The guiding station according to claim 1, wherein the cylindrical element is a cylinder screw secured on a supporting section of the guiding station via a slot key.

6. A guiding station for preventing the conveyor belt of a belt conveyor from running off sideways from a preset direction and running up against the supporting structure of the conveyor, wherein the conveyor belt has a predetermined running direction and a lower strand, said guiding station comprising:

a console;

a cylindrical element securing said console and forming an axis of rotation of the console, said console being swingable in a plane parallel to the plane of the conveyor belt;

a pair of guide rollers supported by said console, said rollers being rotatable around their longitudinal axes, wherein the lower strand of the conveyor belt is guided between said rollers;

a plurality of sensor rollers rotatably mounted on the guiding station upstream in the running direction of the conveyor belt from the guide rollers and on both sides of the lower strand of the conveyor belt; and spring elements adapted for elastically pressing the guide rollers against each other and the conveyor belt.

7. The guiding station according to claim 6, wherein the guide rollers are pressed against each other in pairs.

8. The device according to claim 6, wherein the console is divided so that supporting parts of the console extend above and below the plane of the belt, said parts being acted upon by spring forces directed against each other.

9. The guiding station according to claim 8, further comprising flange strips securing helical pressure springs mounted on the parts of the console supporting the guide rollers.

10. The guiding station according to claim 6, wherein the guide rollers are divided into several sections and wherein the parts of said supporting console are connected to each other by crossbeams.

11. The guiding station according to claim 5, wherein the cylinder screw is guided through a rotary sleeve that is rotatably supported in a spacer part screwed to the console.

* * * * *

UNITED STATES PATENT AND TRADEMARK OFFICE
CERTIFICATE OF CORRECTION

PATENT NO. : 5,950,806
DATED : Sept. 14, 1999
INVENTOR(S) : Karl WARNECKE

It is certified that error appears in the above-indentified patent and that said Letters Patent is hereby corrected as shown below:

Title page, item [19], line 2 of the heading, change "Warneke" to --Warnecke--.

item [75], change "Warneke" to --Warnecke--.

Signed and Sealed this

Twenty-third Day of May, 2000

Attest:

Q. TODD DICKINSON

Attesting Officer      *Director of Patents and Trademarks*

UNITED STATES PATENT AND TRADEMARK OFFICE
CERTIFICATE OF CORRECTION

PATENT NO. : 5,950,806
DATED : October 18, 1999
INVENTOR(S) : Karl Warnecke

It is certified that error appears in the above-identified patent and that said Letters Patent is hereby corrected as shown below:

Title page,
Item [19], change "Warneke" to -- Warnecke --.
Item [75], change "Warneke" to -- Warnecke --.

Signed and Sealed this

Twenty-eighth Day of October, 2003

JAMES E. ROGAN
*Director of the United States Patent and Trademark Office*